April 20, 1954
C. D. WILSON
2,676,279
LARGE CAPACITY GENERATOR SHAFT COUPLING
Filed May 26, 1949
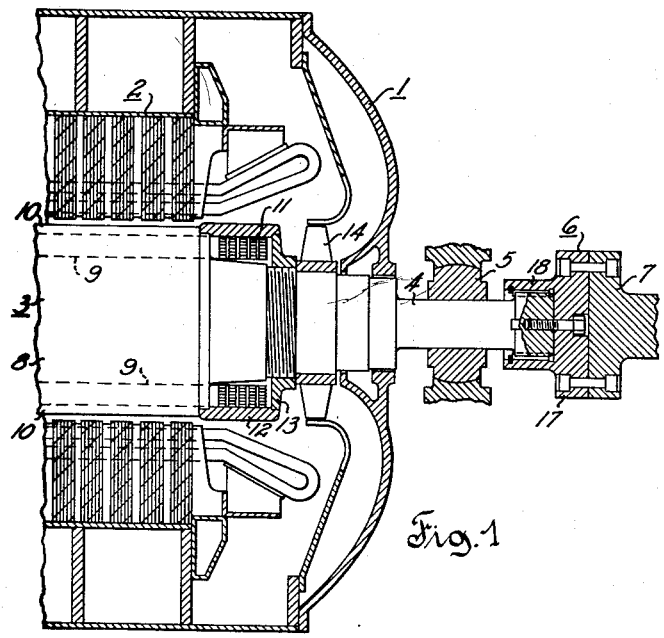
Fig. 1
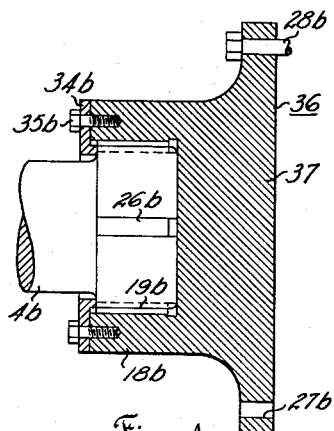
Fig. 4
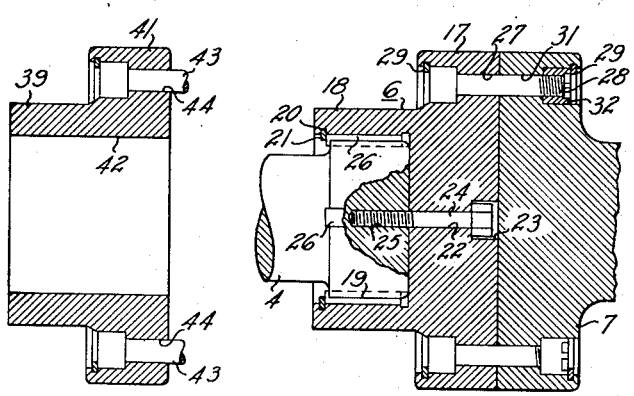
Fig. 5    Fig. 2    Fig. 3
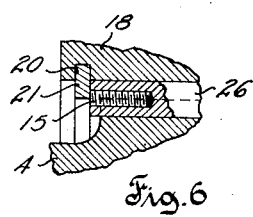
Fig. 6
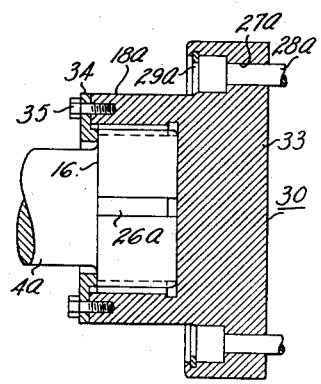
Inventor
Charles D. Wilson
by George M. Albrecht
Attorney Patented Apr. 20, 1954

2,676,279

UNITED STATES PATENT OFFICE 2,676,279

LARGE CAPACITY GENERATOR SHAFT COUPLING

Charles D. Wilson, West Allis, Wis., assignor to Allis-Chalmers Manufacturing Company, Milwaukee, Wis., a corporation of Delaware Application May 26, 1949, Serial No. 95,463

7 Claims. (Cl. 310—75)

This invention relates to electric generators and more particularly to the coupling of shafts for high speed, large size generators on the order of 60,000 to 80,000 and more kilowatts capacity driven at 3600 or more revolutions per minute. The principal object of this invention is the provision of new and improved apparatus of this type.

It is well known to those skilled in the art that stresses resulting from centrifugal forces in a generator rotor will limit the rotor diameter which may be used at a given angular velocity. It is also well known that a generator with a large power output can be made by using a relatively long rotor having a diameter smaller than the above mentioned limit.

The greater the power output of the generator, the greater the torque which the shaft coupling member must transmit. However, it is desirable that the coupling member have an outside diameter smaller than the inside diameter of the generator stator in order that the coupling member need not be removed from the shaft each time the rotor is withdrawn from the stator for service. A generator shaft coupling capable of transmitting relatively high torque must therefore have an outside diameter no larger than the rotor diameter which has, as shown above, definite limits.

To increase the torque transmitting capacity of a coupling without increasing the diameter, the size of the elements connecting the generator shaft coupling member and the driving coupling member must be increased. Such enlarging of the connecting elements will cause an increase in the centrifugal forces acting on the coupling. In generators on the order of 60,000 to 80,000 and more kilowatts capacity driven at 3600 or more revolutions per minute, increases in centrifugal forces would be of such magnitude that conventionally designed couplings of the maximum allowable diameter would be dangerously over stressed. It is, therefore, an object of this invention to provide a generator shaft coupling for relatively large, high speed generators which will be of small enough diameter to permit its being drawn through the generator stator when the rotor is removed and which will be only moderately stressed in operation.

Still another object of the invention is to provide a generator shaft coupling which is simple to design and to manufacture.

Other objects will appear hereinafter as the description of the invention proceeds.

The novel features of the invention and how the objects are attained will appear more fully from this specification and the accompanying drawings showing three embodiments of the invention and forming a part of this application, and all novel features are intended to be pointed out in the claims.

In the drawing:

Fig. 1 is a fragmentary longitudinal section of a generator embodying this invention;

Fig. 2 is an enlarged longitudinal section of the generator shaft coupling shown in the embodiment in Fig. 1;

Fig. 3 is a longitudinal section of a generator shaft coupling member showing another embodiment of this invention;

Fig. 4 is a longitudinal section of a generator shaft coupling member showing another embodiment of this invention;

Fig. 5 is a longitudinal section of a conventional generator shaft coupling member; and Fig. 6 is an enlarged fragmentary view of the longitudinal section of the generator shaft coupling shown in Fig. 2.

In the drawings, like characters designate corresponding parts.

Referring first to Fig. 1 of the drawings, the generator herein illustrated as embodying this invention comprises a generator housing 1 enclosing a stator 2 in which a rotor 3 is rotatably mounted. The rotor 3 has a shaft 4 journaled in bearings 5 at each end of the housing 1 (only one bearing being shown) and provided with a coupling member 6. The coupling member 6 is removably mounted on the end of the shaft 4 and is adapted to be connected to a driving coupling member 7 of a prime mover (not shown) by suitable connecting means.

The generator rotor 3 comprises a rotor body 8, integral with the rotor shaft 4, and provided with circumferentially spaced longitudinal slots 9 in which field windings (not shown) are carried. The portions of the field windings which are disposed in the slots 9 are secured against radial movement by retaining wedges 10. The field windings project beyond the rotor body 8 forming loops 11. The loops 11 are restrained from radial movement by coil support rings 12 and from axial movement relative to the rotor 3 by end disks 13 mounted on the shaft 4. Fans 14 for circulating air through the generator are mounted on the shaft 4 adjacent the end disks 13.

In the fabrication of the generator rotor 3, it is desirable to assemble the coil support rings 12, end disks 13 and fans 14 over the ends of the shaft 4. The coupling member 6 must, therefore, be so constructed that it may be mounted on the shaft 4 after assembly of the rotor 3 and may be removed for disassembly of the rotor 3.

The coupling member 6 shown in Fig. 1 and and Fig. 2 comprises a coupling disk 17 provided with a collar or hub 18 integral with and concentric with the coupling disk 17. The hub 18 is provided with an axially extending cylindrical recess 19, coaxial with the coupling disk 17, in which is carried the end of the rotor shaft 4. The coupling disk 17 has an outside diameter smaller than the inside diameter of the stator 2 and is provided with a centrally located axially extending bore 22 and counterbore 23 of relatively small diameter as compared with the diameter of the shaft carrying recess 19. Holding means cooperable with the shaft 4 and the coupling member 6 prevents relative longitudinal movement between the shaft 4 and the coupling member 6 and is here shown as a bolt 24 disposed in the bore 22 and the counterbore 23 and threaded into an axially extending tapped hole 25 formed in the shaft 4. A plurality of keys 26 prevent relative angular movement between the hub 18 and the shaft 4. As shown in Fig. 6, the keys 26 may be held in place by a lock ring 21 disposed in an annular groove 20 formed in the wall of the recess 19. A tapped hole 15 may be formed in each key 26 to receive a key pulling tool.

The coupling disk 17 is provided with an annular row of circumferentially spaced axially extending holes 27 in which are disposed a plurality of bolts 28 for transmitting torque from the driving coupling member 7 to the generator shaft coupling member 6. The bolts 28 extend through holes 31 in the driving coupling member to engage nuts 32 and are here shown as restrained from axial movement by snap rings 29.

Referring now to Fig. 3 of the drawings, a coupling member 30 is here shown having parts similar to like parts of the coupling member 6 shown in Fig. 1 and Fig. 2 and such similar parts are indicated by like reference characters followed by the suffix "a."

As shown in Fig. 3, the hub 18a carries a coupling disk 33 having a solid center portion and is restrained from longitudinal movement relative to the shaft 4a by holding means which may comprise a split ring 34 secured to the hub 18a by a plurality of bolts 35 threaded axially into the end of the hub 18a. The split ring 34 is disposed to abut a shoulder 16 formed on the end of the shaft 4a in such a manner as to clamp the enlarged end portion of the shaft 4a between the split ring 34 and the coupling disk 33. The means here shown for restraining the coupling member 30 from relative axial motion is illustrative only and other means will suggest themselves to those skilled in the art.

Referring now to Fig. 4 in the drawings, a coupling member 36 is here shown as similar to the coupling member 30 shown in Fig. 3 with one exception; the coupling disk 37 if of nonuniform cross section decreasing in thickness from the hub 18b to the bolt circle. All other parts of the coupling member 36 shown in Fig. 4 are similar to like parts of the coupling member 30 in Fig. 3 and are indicated by like reference characters followed by the suffix "b."

The conventional generator shaft coupling member illustrated in Fig. 5 comprises a hub 39 provided with a radially extending flange 41 at one end. A centrally located bore 42 extends axially through the hub 39 and is adapted to receive the end of a generator shaft (not shown). A plurality of coupling bolts 43 are disposed in an annular row of axially extending holes 44 formed in the flange 41.

In the embodiments shown in Figs. 1, 2, 3 and 4 centrifugal stresses set up by centrifugal forces acting on the bolts 28, 28a, 28b will be carried by the respective coupling disks 17, 33, 37 and the centrifugal stresses in the respective hubs 18, 18a, 18b will be approximately those resulting from centrifugal forces acting on the hubs 18, 18a, 18b and on the keys 26, 26a, 26b. The centrifugal stresses in the coupling disks 17, 33, 37 will be approximately equal to the stresses in a simple rotating disk.

It is well known to those skilled in the art that the magnitude of centrifugal stresses in a solid rotating disk will be less than one-half the magnitude of centrifugal stresses in a disk of the same dimensions, made of the same material, and rotating at the same speed but having an axially extending hole at its center. It is apparent from this principle that the centrifugal stresses in the embodiment of the coupling member shown in Fig. 3 would be smaller than the centrifugal stresses in a conventional coupling as shown in Fig. 5 having the same outside diameter and the shaft carrying bore 42 extending completely through the hub 39 and operating under the same conditions.

It is also known to those skilled in the art that tangential centrifugal stresses in a rotating disk will be a maximum along the circumference of an axially extending, centrally located bore, the value of such bore stresses being a function of the radius of the bore and increasing as the radius of the bore increases. It is apparent from this principle that the bolt carrying bore 22 in the coupling disk 17 of the embodiment shown in Figs. 1 and 2 will result in greater centrifugal stresses in the coupling disk 17 than would be encountered in the solid coupling disk 33, as shown in Fig. 3, operating under identical load conditions. However, if the diameter of the bolt carrying bore 22 is relatively small as compared with the diameter of the shaft 4, the material disposed proximate the center portion of the coupling member 6 will carry a share of the centrifugal forces and the bore stress will not be excessive.

To illustrate, assume first that the coupling member 6 shown in Figs. 1 and 2 is made of steel, has an outside diameter of 31½ inches, a shaft carrying recess diameter of 15 inches, a bolt circle diameter of 25½ inches, a holding means receiving bore diameter of 4 inches and is rotating at 3600 revolutions per minute. Under these conditions, the tangential bore stress in the coupling disk 17 on the circumference of the holding means receiving bore 22, resulting from centrifugal forces and calculated by methods well known in the art, would be 26,000 pounds per square inch.

Assume that the conventional coupling member shown in Fig. 5 is made of steel, has an outside diameter of 31½ inches, a shaft carrying 42 extending completely through the member with a diameter of 15 inches, a bolt circle diameter of 25½ inches, and is rotating at 3600 revolutions per minute. Under these conditions, the tangential bore stress in the coupling flange 41, calculated by methods well known in the art, would be 39,500 pounds per square inch. In order to reduce this stress the coupling bolts 43 would have to be decreased in size and placed on a larger diameter and the thickness of the coupling flange 41 would have to be decreased from the hub 39 to the bolt circle. The coupling member would then be too large to pass through the generator stator.

The aforementioned dimensions and stresses are illustrative only and are not limitative in any way but from them it will be apparent that the illustrated embodiments provide generator shaft coupling members which will be moderately stressed as compared with prior art coupling members having the same outside diameter and operating under similar conditions.

In the embodiment shown in Fig. 4, the reduction in thickness of the coupling disk 37 from the hub to the bolt circle decreases centrifugal forces by reducing the mass rotated and the greater thickness at the center provides more material to carry centrifugal forces. Such a structure would obviously be subjected to smaller centrifugal stresses than would the coupling disk 33 of uniform cross section, as shown in Fig. 3, operating under similar conditions.

From the foregoing it will be apparent to those skilled in the art that the illustrated embodiments of the invention provide new and improved large capacity generator shaft couplings and accordingly accomplish the objects of the invention. On the other hand, it will also be obvious to those skilled in the art that the illustrated embodiments of the invention may be variously changed and modified, or features thereof, singly or collectively, embodied in other combinations than those illustrated without departing from the spirit of the invention, or sacrificing all of the advantages thereof, and that accordingly the disclosure herein is illustrative only, and the invention is not limited thereto.

It is claimed and desired to secure by Letters Patent:

1. The combination comprising: an electric generator, having a capacity of the order of 60,000 kw. or more at 3600 R. P. M., to be coupled to a prime mover, said generator having a stator, a rotor within said stator, a shaft for said rotor, field windings on said rotor, and means including an annular end disk disposed about said shaft, for holding said windings on said rotor, said shaft having a coupling end having a maximum diameter smaller than the inside diameter of said end disk; and a removable coupling member mounted upon said end of said shaft, said coupling member having an outside diameter smaller than the inside diameter of said stator and comprising a collar removably and drivingly secured around said end of said shaft, and a disk forming a bottom for and integral with said collar.

2. The combination comprising an electric generator, having a capacity of the order of 60,000 kw. or more at 3600 R. P. M., to be coupled to a prime mover, said generator having a stator, a rotor within said stator, a shaft for said rotor, field windings on said rotor, and means including an annular end disk disposed about said shaft, for holding said windings on said rotor, said shaft having a coupling end having a maximum diameter smaller than the inside diameter of said end disk; and a removable coupling member mounted upon said end of said shaft, said coupling member having an outside diameter smaller than the inside diameter of said stator and comprising a collar removably and drivingly secured around said end of said shaft, and a disk forming a bottom for and integral with said collar, said disk occupying substantially the entire cross sectional area defined by the inner periphery of said collar and being solid at least from the outer periphery of said collar radially inward substantially to the center of said area.

3. The combination comprising an electric generator, having a capacity of the order of 60,000 kw. or more at 3600 R. P. M., to be coupled to a prime mover, said generator having a stator, a rotor within said stator, a shaft for said motor, field windings on said rotor, and means including an annular end disk disposed about said shaft, for holding said windings on said rotor, said shaft having a coupling end having a maximum diameter smaller than the inside diameter of said end disk; and a removable coupling member mounted upon said end of said shaft, said coupling member having an outside diameter smaller than the inside diameter of said stator and comprising a collar removably secured around said end of said shaft, said collar having at least one axially extending groove in its inner periphery and means cooperative with said at least one groove for drivingly connecting said collar with said shaft, and a disk forming a bottom for and integral with said collar, said disk occupying substantially the entire cross sectional area defined by the inner periphery of said collar and being solid at least from the outer periphery of said collar radially inward substantially to the center of said area.

4. The combination comprising an electric generator, having a capacity of the order of 60,000 kw. or more at 3600 R. P. M., to be coupled to a prime mover, said generator having a stator, a rotor within said stator, a shaft for said rotor, field windings on said rotor, and means including an annular end disk disposed about said shaft, for holding said windings on said rotor, said shaft having a coupling end having a maximum diameter smaller than the inside diameter of said end disk; and a removable coupling member mounted upon said end of said shaft, said coupling member having an outside diameter smaller than the inside diameter of said stator and comprising a collar removably secured around said end of said shaft, said collar having at least one axially extending groove in its inner periphery and means cooperative with said at least one groove for drivingly connecting said collar with said shaft, and a disk forming a bottom for and integral with said collar, said disk occupying the entire cross sectional area defined by the inner periphery of said collar and being solid at least from the outer periphery of said collar radially inward to the center of said area.

5. The combination comprising an electric generator, having a capacity of the order of 60,000 kw. or more at 3600 R. P. M., to be coupled coupled to a prime mover, said generator having a stator, a rotor within said stator, a shaft for said rotor, field windings on said rotor, and means including an annular end disk disposed about said shaft, for holding said windings on said rotor, said shaft having a coupling end having a maximum diameter smaller than the inside diameter of said end disk; and a removable coupling member mounted upon said end of said shaft, said coupling member having an outside diameter smaller than the inside diameter of said stator and comprising a coupling disk having integral therewith a collar removably and drivingly secured around said end of said shaft, said disk being in a general plane adjacent said end of said shaft and having a coupling portion in said plane radially outside of the outer periphery of said collar and another portion in said plane occupying the entire cross sectional area defined by the inner periphery of said collar and being solid at least from the outer periphery of said collar radially inward to the center of said area.

6. The combination comprising an electric generator having a capacity of the order of 60,000 kw. or more at 3600 R. P. M., to be coupled to a prime mover, said generator having a stator, a rotor within said stator, a shaft for said rotor, field windings on said rotor, and means including an annular end disk disposed about said shaft for holding said windings on said rotor, said shaft having a coupling end having a maximum diameter smaller than the inside diameter of said end disk; and a removable coupling member mounted upon said end of said shaft, said coupling member having an outside diameter smaller than the inside diameter of said stator and comprising a collar removably and drivingly secured around said end of said shaft, and a disk forming a bottom for and integral with said collar with at least the central part of said disk being solid radially inward to the center of said disk.

7. The combination comprising an electric generator having a capacity of the order of 60,000 kw. or more at 3600 R. P. M., to be coupled to a prime mover, said generator having a stator, a rotor within said stator, a shaft for said rotor, field windings on said rotor, and means including an annular end disk disposed about said shaft for holding said windings on said rotor, said shaft having a coupling end having a maximum diameter smaller than the inside diameter of said end disk; and a removable coupling member mounted upon said end of said shaft, said coupling member having an outside diameter smaller than the inside diameter of said stator and comprising a collar removably and drivingly secured around said end of said shaft, and a disk forming a bottom for and integral with said collar with at least the central part of said disk being solid radially inward substantially to the center of said disk.

References Cited in the file of this patent

UNITED STATES PATENTS

| Number | Name | Date |
|---|---|---|
| 292,095 | Carlson | Jan. 15, 1884 |
| 926,330 | Hubert | June 29, 1909 |
| 932,097 | Behrend | Aug. 24, 1909 |
| 1,025,425 | Robeson et al. | May 7, 1912 |
| 1,031,016 | Mason | July 2, 1912 |
| 1,057,928 | Briggs | Apr. 1, 1913 |
| 1,060,871 | Wilson | May 6, 1913 |
| 1,177,638 | Larson | Apr. 4, 1916 |
| 1,330,865 | Handlan, Jr. | Feb. 17, 1920 |
| 1,412,317 | Schneider | Apr. 11, 1922 |
| 1,636,262 | Troendly | July 1, 1927 |
| 2,265,293 | Kuehn | Dec. 9, 1941 |
| 2,486,277 | Hagg | Oct. 24, 1949 |
| 2,531,961 | Baines | Nov. 28, 1950 |
| 2,601,389 | Guelph | June 24, 1952 |

FOREIGN PATENTS

| Number | Country | Date |
|---|---|---|
| 16,555 | Great Britain | Jan. 23, 1908 |
| 291,087 | Great Britain | Oct. 11, 1928 |
| 507,767 | Great Britain | June 20, 1939 |